United States Patent

Wupper

[11] Patent Number: 5,332,303
[45] Date of Patent: Jul. 26, 1994

[54] ANTI-LOCK-CONTROLLED BRAKE SYSTEM

[75] Inventor: Hans Wupper, Friedrichsdorf/Ts., Fed. Rep. of Germany

[73] Assignee: Alfred Teves GmbH, Frankfurt am Main, Fed. Rep. of Germany

[21] Appl. No.: 860,508

[22] PCT Filed: Sep. 26, 1991

[86] PCT No.: PCT/EP91/01842

§ 371 Date: Jun. 16, 1992

§ 102(e) Date: Jun. 16, 1992

[87] PCT Pub. No.: WO92/06873

PCT Pub. Date: Apr. 30, 1992

[30] Foreign Application Priority Data

Oct. 17, 1990 [DE] Fed. Rep. of Germany ....... 4032874
Dec. 14, 1990 [DE] Fed. Rep. of Germany ....... 4039988

[51] Int. Cl.⁵ .................... B60T 13/18; B60T 11/232; F16J 9/20; F16J 9/28
[52] U.S. Cl. .................... 303/116.1; 303/87; 60/588; 277/165
[58] Field of Search ............ 303/116.1, 116.2, 10, 303/11, 87, 113.2; 277/165; 60/588

[56] References Cited

U.S. PATENT DOCUMENTS

| | | | |
|---|---|---|---|
| 3,860,250 | 1/1975 | Lundquist | 277/165 |
| 4,179,131 | 12/1979 | Nussbaumer | 277/165 |
| 4,759,591 | 7/1988 | Reinartz et al. | 303/116.1 |
| 5,058,961 | 10/1991 | Mergenthaler et al. | 303/116.2 X |

FOREIGN PATENT DOCUMENTS

| | | | |
|---|---|---|---|
| 217406 | 4/1958 | Australia | 277/165 |
| 2359589 | 6/1974 | Fed. Rep. of Germany | 277/165 |
| 2187247 | 9/1987 | United Kingdom | 303/116.1 |
| 2215793 | 9/1989 | United Kingdom | 303/116.1 |
| 2218479 | 11/1989 | United Kingdom | 303/116.1 |

Primary Examiner—Robert J. Oberleitner
Assistant Examiner—Alfred Muratori
Attorney, Agent, or Firm—Robert P. Seitter; J. Gordon Lewis

[57] ABSTRACT

An anti-lock-controlled hydraulic brake system is described having a pump (9) and a master brake cylinder (1). An arrangement for controlling the pump pressure is integrated in the master brake cylinder (1) and consists of the combination of a connection of the pump to the master cylinder and reservoir, and a primary seal (30, 34) cooperating with a compensating hole (36) in the master cylinder wall. The seal (30, 34) consists of an elastic ring (37) lying on the inside and of a slide ring (38) lying on the outside. The necessary communication between the storage reservoir (7) and the brake circuits, which enables the brake circuits to be resupplied via a non-return valve, is effected via the nonreturn valves (10, 11) of the pump (9). The double seal can be backed by a secondary seal (41) which completely seals the working chamber against leakage flow past the primary ring seal.

11 Claims, 2 Drawing Sheets

ANTI-LOCK-CONTROLLED BRAKE SYSTEM

BACKGROUND OF THE INVENTION

This invention is concerned with anti-lock-controlled brake systems in which a pump used to supply fluid under pressure during a control cycle is also connected to the master cylinder. Such a brake system is known from German Published Patent Application (DE-OS) No. 36 27 000. The system is characterized in that the pumps, delivering fluid into the brake circuits during a control operation, directly communicate with the working chambers of the master brake cylinder. The working pistons defining the working chambers are equipped with so-called central valves working as pressure control valves, that operate in such a manner as to adjust the pump pressure to be proportional to the pressure generated in the master cylinder by the brake pedal. The elements of the central valves, i.e., the valve body and the valve seat, need to be of a hardened material such as of metal in order to prevent damage during the opening and closing operations, which take place in uninterrupted succession during a control operation. Further, the pistons are provided with sealing cups acting as a non-return valve so as to ensure that, in case of a quick release of the brake, fluid can enter the brake circuits from the storage reservoir via the sealing cups.

There are also known conventional master brake cylinders provided with so-called compensating holes. Directly in front of a sealing cup, these holes lead into the working chamber of the master brake cylinder from the reservoir. With the master brake cylinder not being actuated, communication exists between the brake circuits and the storage reservoir via the compensating hole. Upon actuation of the master brake cylinder, the working pistons are displaced and the sealing cup slides across the compensating hole so that the brake circuits will be locked hydraulically and a pressure build-up will be possible. Such master brake cylinders cannot be used in anti-lock-controlled brake systems of the above-mentioned type since, with a control of the pump pressure proportional to the brake pedal pressure, the sealing cups would move past the compensating holes under a high pressure and, in doing so, would be destroyed.

In principle, it would be possible to manufacture the sealing cup of a harder material so that there would be no damage during control cycles. In this case, however, the seal would be unable to perform a nonreturn valve function as does a soft material sealing cup.

For this reason, master cylinders with central valves in accordance with the above-mentioned prior art were used in anti-lock-controlled brake systems. It goes without saying, that the manufacture of such master brake cylinders with central valves is considerably more expensive and intricate than that of master brake cylinders for conventional brake systems.

It is thus an object of this invention to design an anti-lock-controlled brake system such as to enable the use of a simple master brake cylinder.

SUMMARY OF THE INVENTION

According to the invention, a seal of hardened material is used, and the pump is designed such as to itself provide a flow path for fluid through the pump upon a quick release of the brake, with the pump not in operation. To this end, nonreturn valves which operate as suction and delivery valves for reciprocating piston pumps are used each valve having an extremely low opening pressure. The sealing on the working piston of the master brake cylinder can consist either of a combination of an elastic ring and of a slide ring, with, for instance, the elastic ring being made of rubber and the slide ring of Teflon, or a single high Shore hardness rubber ring.

This invention also enables a reduction in the bore surface quality requirements, to prevent any surface defects from causing a circuit failure. The invention also compensates for slight leakage occurring with slide ring sealing, namely the extremely slight leakage in the low-pressure range.

DETAILED DESCRIPTION

Figure 1:
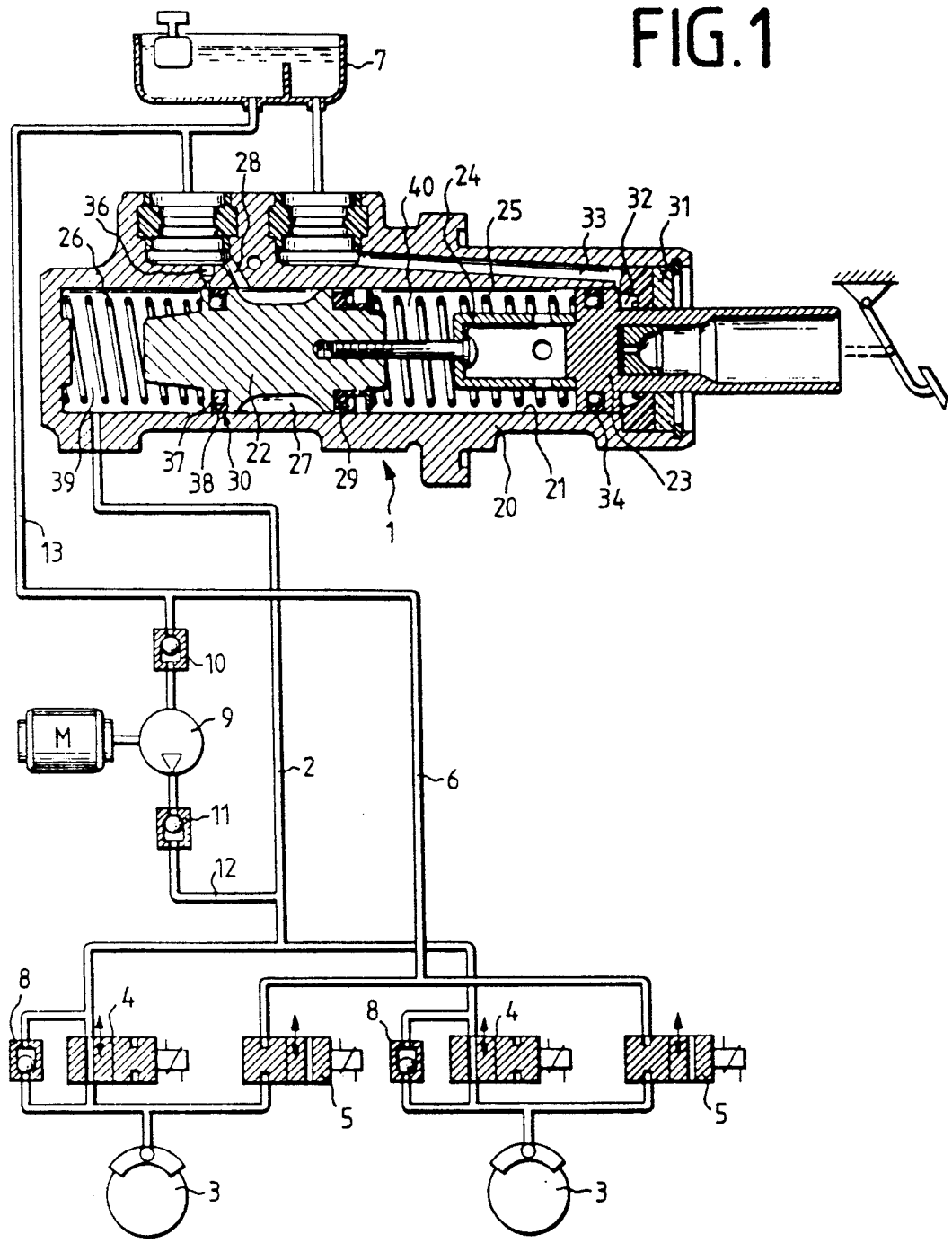
FIG. 1 is a schematic diagram of an antilock controlled brake system according to the present invention with a sectional view of a master cylinder incorporated therein.
Figure 2:
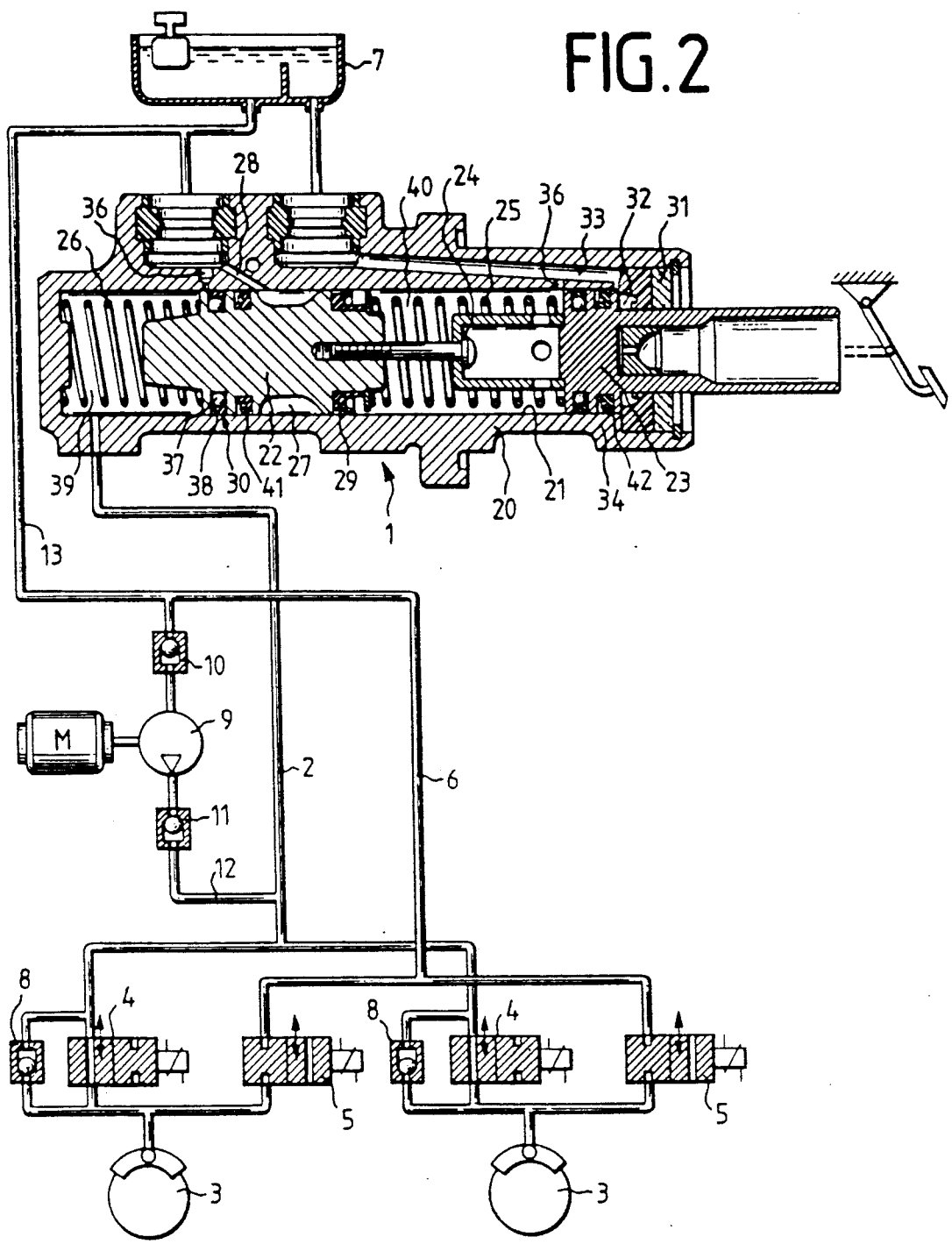
FIG. 2 is a schematic diagram of an antilock controlled brake system with a sectional view of a second embodiment of a master cylinder incorporated therein.

The antilock controlled brake system shown in FIGS. 1 and 2 consists of a master brake cylinder 1 with wheel brakes 3 connected thereto via a brake line 2. An inlet valve 4 is in the brake line 2. The wheel brakes 3 further communicate with a storage reservoir 7 via a return line 6. An outlet valve 5 is inserted into the return line 6. The inlet and outlet valves are electromagnetically operated, the inlet valve 4 being open when deenergized, the outlet valve 5 being closed when deenergized. When energized, the valves 4, 5 will change over so that inlet valve 4 will block the brake line 2 and outlet valve 5 will open the return line 6. The operation of the valves 4, 5 enables fluid under pressure to flow out and to be resupplied to the wheel brakes so that the braking pressure in the wheel brake is thereby controlled.

By means of a non-illustrated sensor, it is possible to monitor the rotational behavior of the wheel, with the sensor signals transmitted to an electronic evaluation unit (not shown) generating operating signals for the inlet and outlet valves. The operating signals are formed in accordance with an algorithm in the manner well known to those skilled in the art, preventing the wheels from locking.

A pump 9 is included in the brake system, the pump 9 drawing fluid in from the storage reservoir 7, and, via a pressure line 12, delivering fluid into the brake line 2 between the master brake cylinder 1 and the inlet valve 4. The pump 9 serves to resupply the brake circuit with fluid removed from the wheel brakes during control. Usually a reciprocating piston pump is provided for such systems, the pump 9 having a suction valve 10 and a delivery valve 11 associated with the pump inlet and outlet respectively. The suction valve 10 is arranged in the suction line 13 between the storage reservoir 7 and the inlet of the pump 9 and opens towards the pump 9. The delivery valve 11 is in the pressure line 12 between the outlet of the pump 9 and the brake line 2 and opens towards the brake line 2. The opening pressure of the non return valves 10, 11 is to be as low as possible, i.e., at a negligible or minimal opening pressure.

The master brake cylinder itself consists of a housing 20 with a longitudinal bore 21 wherein a floating piston 22 and a push-rod piston 23 are slidably mounted in a sealing manner. Floating piston 22 and push-rod piston 23 are interconnected by means of a coupling unit 24 defining the maximum distance between the two pistons. A spring 25 is arranged between the two pistons, keeping them at their maximum distance.

Return spring 26 is arranged between the end of the bore 21 and the floating piston 22 and urges the floating piston 22 into its retracted, return position. Within the bore 21, the pistons 22, 23 each define a respective working chamber 39, 40.

Another similar brake circuit may be connected to working chamber 40, such brake circuit being the same as that associated with working chamber 39.

On its outside edge, the floating piston 22 is provided with an annular chamber 27 communicating permanently with the storage reservoir 7 via a housing channel 28. The annular chamber 27 is sealed with respect to both working chamber 40 and working chamber 39. With regard to working chamber 40, a sealing cup 29 is provided; with regard to chamber 39, a double primary seal 30 is provided which will be described in more detail further below. The push-rod piston 23 has a smaller-diameter portion which is passed in a sealing manner through a plug 31 and to which a pedal is drivingly connected plug 31 partitions off a supply chamber 32 in the housing, the chamber 32 communicating with the storage reservoir 7 via a housing bore 33. Working chamber 40 and supply chamber 32 are separated from each other by means of a double primary seal 34 on the push-rod piston 23.

Double seals 30, 34 are each inserted into a groove located adjacent the end facing the associated working chamber 39, 40 and recessed into the outside of each respective piston 22, 23. Each seal 30, 34 consists of an inner first elastic ring 37 of round cross-section (such as of rubber. Outside the rubber ring 37, there is a Teflon slide ring 38 of rectangular cross-section. The inner rubber ring 37 is slightly prestressed and thus pushes the outer ring 38 outwardly against the wall surface of the bore 21.

In accordance with FIG. 2, the double seals 30, 34 are each inserted into a first annular groove on the respective piston 22 or 23. Next to each double seal 30, 34, there is provided a respective secondary sealing cup 41, 42 in an adjacent second groove. The first and second grooves lie side by side and are separated from each other by means of a rib. The first groove lies nearest to the piston end adjacent the respective working chamber 39, 40. The sealing cups 41 42, are of a usual type, having a lip pressing on the wall of the bore 21 and thus achieving the sealing action.

In the illustrated retracted position of pistons 22 and 23, compensating holes 36 directly in front of the seals 30, 34, lead into the respective chambers 39, 40. The compensating holes 36 communicate with the storage reservoir 7. They have a narrow cross-section on the order of 0.8 mm. It is possible to have an even smaller hole and to provide a plurality of compensating holes on the periphery of the housing bore 21.

The system has the following mode of operation:

The symbolically represented pedal being operated, at first the push-rod piston 23 will be displaced, under the action of spring 25, the floating piston 22 also becoming displaced.

The outer rings 38 of the double seals 30, 34 will slide over the respective compensating hole 36 and will thus close communication between the working chambers 39, 40 and the storage reservoir 7. The brake circuits will be closed hydraulically so that a pressure may build up in the brake circuits to brake the vehicle. The nonreturn valve 11 at the pump outlet will prevent the brake circuit pressure from being discharged into the storage reservoir 7.

Upon the release of the brake, the pistons 22 and 23 will be displaced to the right (see drawing) under the action of return springs 25 and 26. During this action there may form a vacuum in the system so that fluid will be drawn from the storage reservoir 7 into the brake circuits via the non return valves 10 and 11 of the pumps 9. As soon as the pistons 22, 23 have reached their return positions, the compensating holes 36 will be opened so that, with the brake not applied, the brake circuits will communicate with the storage reservoir 7.

During a braking operation, the pressure may increase to a level causing wheel lock-up. The brake system will then switch into the anti-lock control mode, in which the motor driving the pump 9 is activated. Via pressure line 12, pump 9 delivers fluid from the storage reservoir 7 into the brake circuit, thereby causing fluid under pressure to flow to working chambers 39 and 40.

The pistons 22, 23 are displaced, against the pedal actuating force, back to their return positions until the compensating holes 36 are uncovered. Excess fluid will now escape into the storage reservoir 7 via compensating hole 36. In doing so, the pressure in the working chambers will be reduced so that, under the action of the pedal pressure, the pistons will again be displaced to the left, the compensating holes 36 again being blocked. Since the pump 9 will continue to deliver, the pistons 22, 23 will again be reset, the compensating holes 36 again opened. This operation will repeat itself in quick succession so that, in the end, there will result a flow metering, with that much fluid being discharged via compensating hole 36 as will be delivered by pump 9 into the working chambers 34, 40 of master brake cylinder 1. The adjusted pressure will correspond to the pedal pressure.

In order to prevent the slide rings 38 from being damaged they must have a certain hardness. The same must be chosen so as to ensure that even a repeated sliding past the compensating hole 36 will not cause any damages to the slide ring sealing 38.

The additional sealing cups as per FIG. 2 will perform the following task. Because of its hard surface structure, the slide ring of the double seal cannot perfectly seal the working chamber 39, 40. There will thus always be a small leakage. In case of damage to the slide ring sealing or to the wall of the bore 21 there may also be a major flow of fluid past the slide ring sealing. The secondary seals 41, 42 are thus arranged behind the double seals to insure that the working chamber 39, 40 will be sealed completely and prevent any significant volume of leakage flow from being removed completely from the associated brake circuit and from entering respectively annular chamber 27 or compensating chamber 32. The pressure in the area between the two seals will not be very great as the leakage will generally be small, thus the sealing cup overriding compensating hole 36 under but a small pressure. Any damage to the seal will thus be avoided. This arrangement has a further advantage in that there is no need for an extremely smooth surface treatment of the wall of the bore 21 as a certain leakage flow along the double seal can be tolerated. The inner and outer rings 37, 38 may be combined into one ring of a high Shore hardness.

I claim:

1. An anti-lock-controlled brake system including at least one wheel brake, a brake pedal, a master brake cylinder having a housing with an internal bore formed therein, at least one working piston and one working chamber, said working chamber defined in part by one end of said working piston and by said internal bore, said working piston slidably movable in said master cylinder housing, said internal bore of said brake pedal engaged with said working piston, a return spring acting on said working piston in opposition to said brake pedal engagement, said working piston movable towards and away from a retracted position by actuation by said brake pedal and return by said return spring, a storage reservoir, means for communicating said working chamber with said reservoir, including a valve arrangement opening communication when said master brake cylinder is not operated, and closing said communication when said master brake cylinder is operated, a controllably operable pump having a suction side inlet connected to said storage reservoir and a delivery side outlet connected to said working chamber and said at least one wheel brake, a brake line connected to said working chamber and said pump outlet and said wheel brake and a return line connecting said reservoir to said wheel brake, an inlet valve associated with said wheel brake and controlling communication of said wheel brake with said working chamber and pump outlet via said brake line and an outlet valve controlling communication of said reservoir and said wheel brake via said return line and enabling a slip-dependent wheel brake pressure control, said valve arrangement including a primary seal provided on said working piston and retained in an external groove in said working piston adjacent said one end thereof defining said working chamber, said seal comprised of an inner first elastic ring and of an outer second ring of harder material, said outer second ring expanded by said inner first ring to engage said internal bore in said master brake cylinder housing to be in sliding engagement therewith as said working piston is moved in said bore; a narrow hole in said master cylinder directly leading into said working chamber, located just ahead of said seal when said working piston is in said retracted position to allow flow through said narrow hole and past said one end of said piston into said working chamber; said pump open to free fluid flow therethrough from said reservoir to said working chamber when said pump is not operated and said brake pedal is released.

2. A brake system as claimed in claim 1, wherein said pump has a suction valve and a delivery valve associated with said inlet and outlet, each of said suction valve and said delivery valve being non-return valves with a minimal opening pressure.

3. A brake system as claimed in claim 1, wherein said inner first ring is of rubber and said outer second ring is of Teflon.

4. A brake system as claimed in claim 3, wherein said inner first ring has a circular cross-section and said outer second ring has a rectangular cross-section.

5. A brake system as claimed in claim 1, further including a second seal disposed in a second groove recessed into said working piston, said second groove adjacent to said external groove but away from said piston one end defining said working chamber.

6. A brake system as claimed in claim 5 wherein said second seal comprises an elastic seal.

7. An antilock brake system comprising at least one hydraulically operated wheel brake, a brake pedal, a master cylinder having a housing formed with a bore, a piston slidably disposed in said bore defining with one end thereof a working chamber, said piston operatively connected to said brake pedal to be able to be stroked away from a retracted position, said bore to an advanced position, return spring means for returning said piston to said retracted position in said bore, a brake line connecting said master cylinder working chamber to said wheel brake, an inlet valve in said brake line for controlling communication between said working chamber and said wheel brake, a reservoir, a return line extending between said wheel brake and said reservoir for return fluid flow, an outlet valve in said return line controlling communication between said reservoir and said wheel brake, pump means able to be operated to pressurize fluid, said pump means having an inlet connected to said reservoir and an outlet connected to said brake line at a point between said working chamber and said inlet valve, a first one way valve connected to said pump means inlet opening only towards said pump means and a second one way valve connected to said pump means outlet opening only towards said brake line, said first and second one way valves having a negligible opening pressure, a primary seal on said piston adjacent said one end defining said working chamber, said primary seal slidably engaging said master cylinder, a compensating hole entering through said master cylinder bore at an axial location to be just opened directly into said working chamber when said piston moves to said retracted position in which said one end thereof is withdrawn past said compensating hole to allow flow from said reservoir through said compensating hole and past said piston one end and into said working chamber, and a fluid connection between said reservoir and said compensating hole, said pump means open to free fluid flow therethrough in the opening direction of said first and second one way valves when said pump means is not operated and said brake pedal is released, whereby said piston seal and said compensating hole can act to meter flow out of said working chamber to said reservoir when said working chamber is pressurized by said pump means to adjust said pump means pressure to said working chamber pressure level developed by said brake pedal.

8. The antilock brake system according to claim 7 wherein said primary seal includes a relatively hard outer ring and elastic means urging said hard outer ring outwardly to engage said master cylinder bore.

9. The antilock brake system according to claim 8 wherein said outer ring comprises a plastic ring and further including an elastic inner ring comprising said means urging said outer ring outwardly.

10. The antilock brake system according to claim 7, wherein said primary seal comprises a ring of relatively hard material and further including a secondary seal comprising a ring of relatively softer material axially spaced from said primary seal in a direction away from said one end of said piston.

11. The antilock brake system according to claim 7, wherein said compensating hole is of a size on the order of 0.8 mm in diameter.

* * * * *